(12) United States Patent
Kirsch (10) Patent No.: US 11,320,542 B2
(45) Date of Patent: May 3, 2022

(54) METHOD FOR DETERMINING A POSITION

(71) Applicant: Elektrobit Automotive GmbH, Erlangen (DE)

(72) Inventor: Fabian Kirsch, Erlangen (DE)

(73) Assignee: ELEKTROBIT AUTOMOTIVE GMBH, Erlangen (DE)

( * ) Notice: Subject to any disclaimer, the term of this patent is extended or adjusted under 35 U.S.C. 154(b) by 431 days.

(21) Appl. No.: 16/008,868

(22) Filed: Jun. 14, 2018

(65) Prior Publication Data

US 2018/0364365 A1    Dec. 20, 2018

(30) Foreign Application Priority Data

Jun. 14, 2017   (DE) .................... 10 2017 210 050.8

(51) Int. Cl.
| | | |
|---|---|---|
| *G01S 19/37* | (2010.01) | |
| *G01C 21/20* | (2006.01) | |
| *G01C 21/28* | (2006.01) | |

(52) U.S. Cl.
CPC .............. *G01S 19/37* (2013.01); *G01C 21/20* (2013.01); *G01C 21/28* (2013.01)

(58) Field of Classification Search
CPC ........ G01S 19/37; G01S 5/0263; G01S 19/26; G01S 19/49; G01C 21/28; G01C 21/20; G01C 21/165; G01C 21/30
See application file for complete search history.

(56) References Cited

U.S. PATENT DOCUMENTS

| | | | |
|---|---|---|---|
| 6,408,245 B1 | 6/2002 | An et al. | |
| 8,773,303 B2 | 7/2014 | Doucet et al. | |
| 2007/0037582 A1* | 2/2007 | Mohi | .................... G01S 5/0018 455/456.1 |
| 2010/0141515 A1* | 6/2010 | Doucet | ................... G01S 19/39 342/357.55 |
| 2017/0147959 A1* | 5/2017 | Sweeney | ................ G07C 5/008 |
| 2018/0130347 A1* | 5/2018 | Ricci | ................... G08G 1/0112 |

FOREIGN PATENT DOCUMENTS

| | | |
|---|---|---|
| CN | 101886927 | 11/2010 |
| CN | 102089624 | 6/2011 |
| CN | 102538809 | 7/2012 |

(Continued)

OTHER PUBLICATIONS

Eride, Inc; Furuno Electric Company Limited, / Road map feedback corrections in tightly coupled gps and Trimble Terrasat GMBH / Positionsverfolgungsgerat und Verfahren / May 20, 2010 n.n./ Wikipedia / Sensordatenfusion /Mar. 10, 2016.

(Continued)

*Primary Examiner* — Regis J Betsch
*Assistant Examiner* — Jeremy A Delozier
(74) *Attorney, Agent, or Firm* — Cozen O'Connor (57) ABSTRACT

In a method for determining a position, in particular of a vehicle, a first position determination entity is defined as the active position determination entity. The position determined by the active position determination entity is output as the currently determined position. A further position determination entity is started and determines a position on the basis of the received sensor data. If the further position determination entity has reached a stable status, it is defined as the active position determination entity.

12 Claims, 3 Drawing Sheets

(56) References Cited

FOREIGN PATENT DOCUMENTS

| CN | 103124947 | 5/2013 |
|---|---|---|
| CN | 104884902 | 9/2015 |
| DE | 112007003538 T5 | 5/2010 |
| EP | 2144038 A2 | 1/2010 |
| EP | 2 557 436 A1 | 2/2013 |
| EP | 2541198 | 2/2013 |
| WO | WO 2013/071944 | 5/2013 |

OTHER PUBLICATIONS

Office Action dated Aug. 3, 2021 issued in Chinese Patent Application No. 201810608023.9.
Office Action dated Apr. 24, 2018 issued in German Patent Application No. 102017210050.8.
Wikipedia, "Sensordatenfusion", Mar. 10, 2016.

\* cited by examiner

METHOD FOR DETERMINING A POSITION

BACKGROUND OF THE INVENTION

1. Field of the Invention

The present invention relates to a method for determining a position, in particular of a vehicle, a computer program and a computer program product which are used to carry out the methods a storage medium on which a corresponding computer program product is stored, a corresponding apparatus and a navigation device.

2. Description of the Related Art

EP 2 541 198 discloses road map correction for tightly coupled GPS and vehicle dead-reckoning navigation. In this case, the vehicle position determined using GPS or wheel sensors is compared with data from a stored road map and is corrected if necessary. This prevents initially small errors in the input data of the vehicle position determination resulting in a considerable difference between the determined position and the actual position over a relatively long period. GPS data are inaccurate at a low vehicle speed, for example, and are therefore usually ignored at a low speed. Data from wheel sensors result in a drift over relatively long distances or periods and are therefore used only in exceptions over relatively long distances or periods, for example if a sufficiently good GPS position signal is not available in a tunnel or in a street canyon.

It has been found that there are other situations in which an incorrect position is determined but is not noticed or is not noticed over a relatively long time, as a result of which the navigation does not lead to the destination or does not lead to the correct destination. For example, the comparison with a road map also cannot reveal an incorrectly determined position if a regularly repeating, for instance checkered, system of roads is involved and an incorrect position that is offset by a period or the multiple thereof is already assumed at the beginning.

For a method for determining the position and a corresponding navigation device, it is therefore desirable to avoid situations in which an incorrect position is determined but is not noticed or is not noticed over a relatively long period.

SUMMARY OF THE INVENTION

According to an aspect of the invention, a method is proposed for overcoming the problems of the prior art. In this case, sensor data from a global navigation satellite system, also called a GNSS, from wheel sensors of a vehicle, such as odometers, and steering angle sensors, from acceleration sensors or other sensors contained in a vehicle, are received. Examples of a GNSS are GPS (Global Positioning System), Glonass or the European Galileo system. The expression GPS is mainly used for GNSS in the following text. If the method is carried out on a mobile device, for example a smartphone or a mobile navigation device, the presence of WLAN transmitters, magnetic field sensors, air pressure sensors, the presence of mobile radio cells, for example according to the GSM or LTE standards, or further suitable sensor data can be used as further or alternative sensor data.

Furthermore, a first position determination entity is started and determines a position on the basis of a start position and the received sensor data. The position determination entity may be both a position determination unit implemented in hardware and may be implemented as software, for example as an executable software routine. A combination of a hardware and software implementation can also be advantageously used here. The start position represents the past and is used as the starting point of the position determination. The received sensor data are used to describe the start position further and represent the present. The start position is advantageously a position determined earlier and is taken from a persistent memory. This is a reliable starting value, in particular if a position determination unit is installed in the vehicle, in particular when the position determination is also activated with each vehicle movement. It is likewise useful to use an actual position predefined by the user as the start position. This is useful, in particular, in mobile devices or other devices in which the position determination is not switched on with each location change of the device. Another suitable start position can also be usefully used depending on the circumstances. This first position determination entity is defined as the active position determination entity, and the position determined by it is output as the current determined position.

According to an aspect of the invention, a further position determination entity is started and determines the position on the basis of the received sensor data. This is a further hardware unit that operates in parallel with the first position determination unit, further software running in parallel or a combination of hardware and software running in parallel with the first position determination entity. The received sensor data are mainly used in this case. This represents the past, and the position determination is therefore independent of possible errors in the persistently stored starting value of the first position determination entity. For example, a position change in the switched-off state, which is not reflected in the persistently stored start position, does not have a negative effect in this manner on the position determination of the further position determination entity.

A check is also carried out to determine whether the further position determination entity has reached a stable status. There are measures known to a person skilled in the art for this check. One simple possibility is to define the reaching of a stable status by virtue of the fact that the difference between the successive positions determined by the further position determination entity is below an acceptable tolerance value. The manner in which a stable status can be best determined is closely related to how the position determination entity is internally constructed. For the present invention, it is important for the position determination entity to signal when it can assume responsibility, that is to say when it has reached a stable status. If the further position determination entity has reached a stable status, this is defined as the active position determination entity and the position determined by it is output as the current determined position. The previous active position determination entity is restarted, in which case a start position is not used here, but rather only the currently received sensor data.

One advantage of this method is that possible errors that cannot be eliminated and are based on incorrect sensor data in the past are not included in the further position determination entity, which is defined as the new active position determination entity if these incorrect sensor data are far enough in the past, that is to say occurred before the restarting of the further position determination entity, which becomes the new active position determination entity. This is independent of whether it is known what the cause of the error is or how it can be compensated for.

An aspect of the invention provides for the further position determination entity to be restarted if it has not reached a stable status after a predefined event has occurred. The predefined event is, for example, the expiry of a particular time after restarting the further position determination entity. An event that is likewise useful is the coverage of a particular distance after restarting the further position determination entity. This distance results, for example, from a sensor signal derived from the wheel revolution. The reception of a minimum number of GPS sensor signals after restarting the further position determination entity is also usefully used as such an event. Further events may also be usefully used here and the event may likewise be derived from a combination of a plurality of these individual events.

If the position determination is intended to be terminated or interrupted, provision is made for the currently determined position to be persistently stored and for the active position determination entity and the further position determination entity to be stopped. Otherwise, a check is continuously carried out in order to determine whether the further position determination entity which is currently not defined as the active position determination entity has reached a stable status. If this is the case, this is defined as the active position determination entity and the previous active position determination entity is restarted. This ensures that the currently determined position is influenced as little as possible by errors in the sensor signals or in the evaluation thereof that occurred in the past since the position determination entity, which is stable based on sensor signals from the recent past, is used to determine the position. The risk of being influenced by errors further in the past is lowest in this position determination entity. In the simplest case, only the currently determined position of the active position determination entity is persistently stored. Upon restarting the position determination, this then begins with the stored position as the start position. The further position determination entity begins with a restart and is based only on new sensor signals received after the restart. This has the advantage that the active position determination entity is very quickly in a stable state and only little persistent storage space is nevertheless required. It is likewise possible to also store the position of the further position determination entity even if the latter has not yet reached a stable status. This has the advantage that the further position determination entity need not start at zero after restarting the position determination, but rather can begin with the stored position which was last available for it but has not yet been classified as stable as the starting value and therefore reaches a stable state more quickly. However, this requires additional persistent memory, which is often scarce or costly.

Another aspect of the invention provides for a second or a plurality of further position determination entities to be started with a delay, and for the respectively next further position determination entity that reaches a stable state to be defined as the active position determination entity. This has the advantage that it does not take so long for a further position determination entity to reach the stable status after restarting the previous active position determination entity. A possibly defective active position determination entity is therefore more quickly replaced with a new further position determination entity that has settled, that is to say is in the stable status.

The active position determination entity is then advantageously replaced with a further position determination entity if a predefined event occurs. A new active position determination entity is then not immediately defined if the further position determination entity has reached a stable status, but rather upon the occurrence of a differently defined event. This is, for example, the expiry of a certain time or the coverage of a certain distance after restarting the further position determination entity or after the time at which a new active position determination entity was last defined. This has the advantage that the change between the respectively active position determination entities does not occur too often, which reduces the number of possible jumps during the transition from one active position determination entity to the other and saves computing capacity. The interruption or termination of the position determination is also usefully considered to be such a predefined event. This has the advantage that a new active position determination entity is initially defined, the position of which is then persistently stored. A starting value that is as free of errors as possible is therefore available when restarting the position determination.

An aspect of the invention provides for a further position determination entity to be restarted, even if it is already in a stable status, if a predefined number of further position determination entities have reached a stable status after it. This has the advantage that not too many position determination entities are in a stable state and are therefore potentially in a state which has not been recognized as defective on account of an incorrect sensor signal which is not too far in the past. A number of position determination entities, which is considered to be a useful minimum number, are therefore always in the state shortly after the restart, which position determination entities will soon reach a stable state and are then uninfluenced by incorrect sensor data even in the recent past or incorrectly evaluated sensor data and therefore determine a correct position. The predefined number is, for example, two position determination entities or half of the number of further position determination entities. Other numbers may also be useful here depending on the circumstances.

When defining a further position determination entity which is intended to be newly defined as the active position determination entity, one variant of the invention provides for that further position determination entity which has reached a stable status as the n-last entity to be selected. For n=1, this is the last position determination entity that has reached a stable status. For n=2, the penultimate position determination entity, for n=3, the third to last position determination entity, etc. This has the advantage that the new active position determination entity has not only reached the stable status recently, but rather the stable status has also already lasted for a certain time. The method is therefore less susceptible to premature assessments of the stable status. If the active position determination entity itself classifies its status as no longer stable, one of the further position determination entities is defined as the active position determination entity and the previous position determination entity is restarted. If one of the further position determination entities which are in the stable status classifies itself as no longer stable, this position determination entity is also restarted as long as at least one of the further position determination entities is still in the stable status. Otherwise, it is assumed that there is a serious fault. The position determined by the active position determination entity is then output, possibly with the notification that it has not been determined with sufficient reliability.

An aspect of the invention provides for all position determination entities to have identical method steps for determining the position. This has the advantage that the position determination entities can be programmed as identical software, and there is no need for any outlay for programming, testing, compiling, etc., or another technical evaluation algorithm. A corresponding situation applies to position determination entities implemented in hardware or to those combined from hardware and software.

The active position determination entity and the one or more further position determination entities advantageously differ in the value of at least one parameter. This has the advantage that, despite identical method steps or an identical hardware structure, the position determination entities can nevertheless be adapted in a certain manner to different functions or circumstances by changing parameters. A distinction can therefore be made between the active position determination entity and the further position determination entity or between the further position determination entities.

Provision is made for the parameter, in which the active position determination entity and the further position determination entity differ, to be one or more of the following parameters. If the parameter is the latency, a relatively long period in the past is taken into account when determining the position. Sensor values that arrive incorrectly with a delay are taken into account in this situation since they are in an extended time window. This results in a higher degree of accuracy of the position determination. However, the higher degree of accuracy is achieved at the expense of the up-to-dateness. Therefore, one variant provides for the latency to be reduced if the corresponding further position determination entity becomes the active position determination entity. If the parameter is the sampling rate, provision is made for only every tenth value of a sensor signal, for example, rather than every incoming value of a sensor signal to be taken into account for one or more of the further position determination entities. As a result, only one tenth of the processor time is required for each further position determination entity in comparison with the active position determination entity, that is to say the processor capacity is not used too heavily. Nevertheless, a further position determination entity in the stable state is available relatively quickly and can replace the active position determination entity. In this case, it should be noted that particular sensor signal values require preprocessing. For example, signals from a wheel revolution sensor must be added or accordingly given a higher weighting in order to take into account the actual number of wheel revolutions, rather than one tenth. If the parameter is an event that defines the stable state, different further position determination entites can be operated with a focus on different types of sensor signals. For example, one of the further position determination entites reaches the stable status only when a minimum number of GPS satellites are "seen", whereas signals from vehicle sensors are given a lower weighting. Another of the further position determination entities can also reach the stable state without receiving GPS signals and for this purpose imposes a higher demand on the data from the sensors arranged in the vehicle, the data from positioning by WLAN or the data from another positioning method. In the case of such different position determination entites, it is useful to start these position determination entities at the same time, rather than with a time delay, since, despite identical sensor data, they do not arrive at the identical result anyway on account of the differently weighted parameters and generally do not reach a stable status after the same time.

A navigation device according to an aspect of the invention has at least two sensors, the sensor data from which are suitable, alone or in combination with others, for determining a position. The navigation device has a first position determination unit and at least one further position determination unit which are arranged parallel to one another. A controller monitors which of the position determination units, has reached a stable status aid controls a changeover switch to output the determined position. The controller is also used to restart the previous active position determination unit and to possibly specify further parameters.

A vehicle according to the invention has an apparatus suitable and configured to carry out the method steps according to the invention or has a navigation device according to the invention.

BRIEF DESCRIPTION OF THE DRAWINGS

Further advantageous configurations of the invention are also stated in the following description of exemplary embodiments on the basis of figures. Useful combinations and developments which are within the ability of a person skilled in the art are likewise within the scope of the invention.

In the drawings.

DETAILED DESCRIPTION OF THE PRESENTLY PREFERRED EMBODIMENTS

Figure 1:
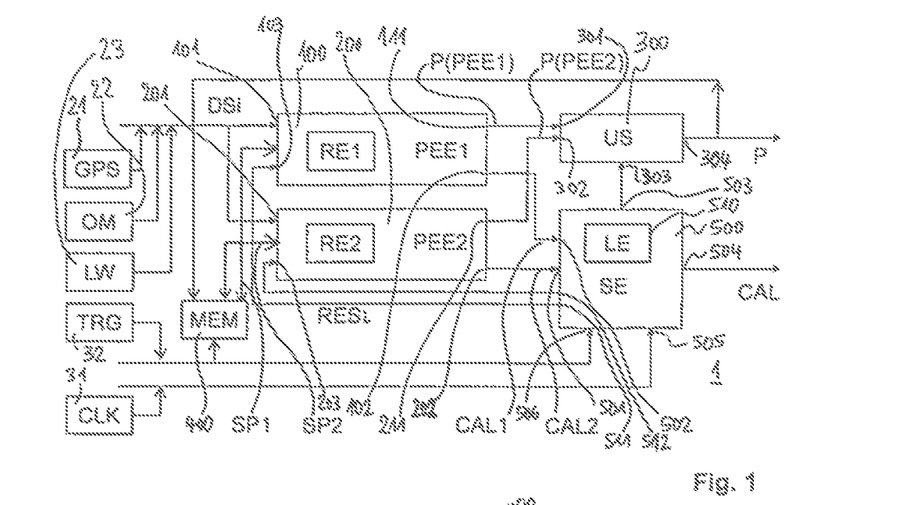
FIG. 1 shows a navigation device according to the invention.

FIG. 1 shows a navigation device 1 that operates in accordance with the method according to the invention. The navigation device has a sensor 21 of a GPS detector, a sensor 22 of an odometer, and a steering angle sensor 23. The corresponding sensor data DS21, DS22 and DS23, also referred to together as DSi, are supplied to the respective sensor data input 101, 201 of a first position determination unit 100, PEE1 and of a second position determination unit 200, PEE2. The sensor data inputs are illustrated as an individual input at which the sensor data DSi serially arrive, for example. A parallel input or a plurality of inputs for different sensor data DS21, DS22, DS23 is/are also provided according to a variant which is not illustrated here.

The position determination units 100, 200 each have a computer RE1, RE2 which determines a position P(PEE1), P(PEE2) from the sensor data DSi and from further input data or parameters and output said position at a position output 111, 211. The determined position P(PEE1), P(PEE2) is forwarded to a changeover switch 300, which outputs a currently determined position P. This position is possibly supplied to a persistent memory 400. The memory is illustrated here as a separate unit but, according to one variant of the invention, each of the position determination units 100, 200 has its own separate persistent memory, which is not illustrated here. The persistent memory 400 respectively has a data connection to the position determination units 100, 200, via which a start point SP1, SP2 is transmitted to the position determination units 100, 200 upon restarting of the latter. Before the position determination units 100, 200 are switched off, the positions P(PEE1) and P(PEE2) determined at this time are stored in the persistent memory 400. In addition to the determined position P(PEEi), the persistent memory 400 also stores information relating to the operating state of the position determination unit PEIi, with the result that the position determination unit is in the same operating state again after restarting or is at least as close as possible to this operating state. For the sake of simplicity, only the storage of the position or the start point is respectively written here, but the start point is generally used to mean not only the position, but rather the state of the position determination entity PEIi in which it starts again after a possible restart.

The position determination units 100, 200 have status outputs 102, 202 at which a calibration indicator signal CAL1, CAL2 is output. This signal indicates whether or not the position determination unit 100, 200 is in a stable status. In the simplest case, the stable status is indicated by the value CAL1=1 and an unstable status is indicated by the value CAL1=0. One variant provides for the calibration state to be indicated in stages, for example as a 2-bit word or a 4-bit word. In this case, it is possible to assume the stable state either only at the highest value CALi or already at a lower value. The stable state can also be variably defined depending on the situation. One variant provides for a lower value to already be accepted for the stable status shortly after restarting the navigation device 1, but for only the highest value to be accepted as of a predefined time after the restart. Provision is likewise made for only the highest value to be accepted during safety-critical use of the current position P, but for lower values to also be accepted during route guidance or in the case of pure information for the driver. The calibration indicator signals CALI are supplied to status inputs 501, 502 of a controller 500. The controller is also designated using the reference symbol SE here. The controller has logic 510, which is also designated using the reference symbol LE.

The logic 510 evaluates the calibration indicator signals CALi and emits a signal to the changeover switch 300 at a selection output 503 so that the changeover switch changes over between the positions P(PEE1), P(PEE2) determined by the position determination units 100, 200 if necessary. A calibration indicator signal CAL is output at a status output 504. The logic 510 also determines whether one of the position determination units 100, 200 is intended to be restarted and emits a reset signal RESi at control outputs 511, 512, which reset signal is supplied to reset inputs 103, 203 of the position determination units 100, 200. The controller 500 also has a clock signal input 505 at which a clock signal emitted by a clock generator 31 is present. The controller 500 also has a trigger input 506 at which a trigger signal emitted by a triggering unit 32 is present. The triggering unit 32 emits a trigger signal if the navigation device is switched on. In this case, the controller 500 triggers a restart of the position determination units 100, 200. It likewise initiates the reading of a start position SP1 from the persistent memory 400 by the position determination unit 100. According to one variant of the invention, a corresponding process is also carried out for the position determination unit 200.

The changeover switch 300 has position inputs 301, 302, which are connected to the position outputs 111, 211. The currently determined position P is output at a position output 303. The selection input 303 is connected to the selection output 503 of the controller 500. Although the position determination units 100, 200 are described as hardware with respect to FIG. 1, FIG. 1 is also used to explain position determination entities PEIn implemented as software. In the following description, the descriptions for position determination entitles can also be accordingly applied to position determination units and vice versa.

Figure 2:
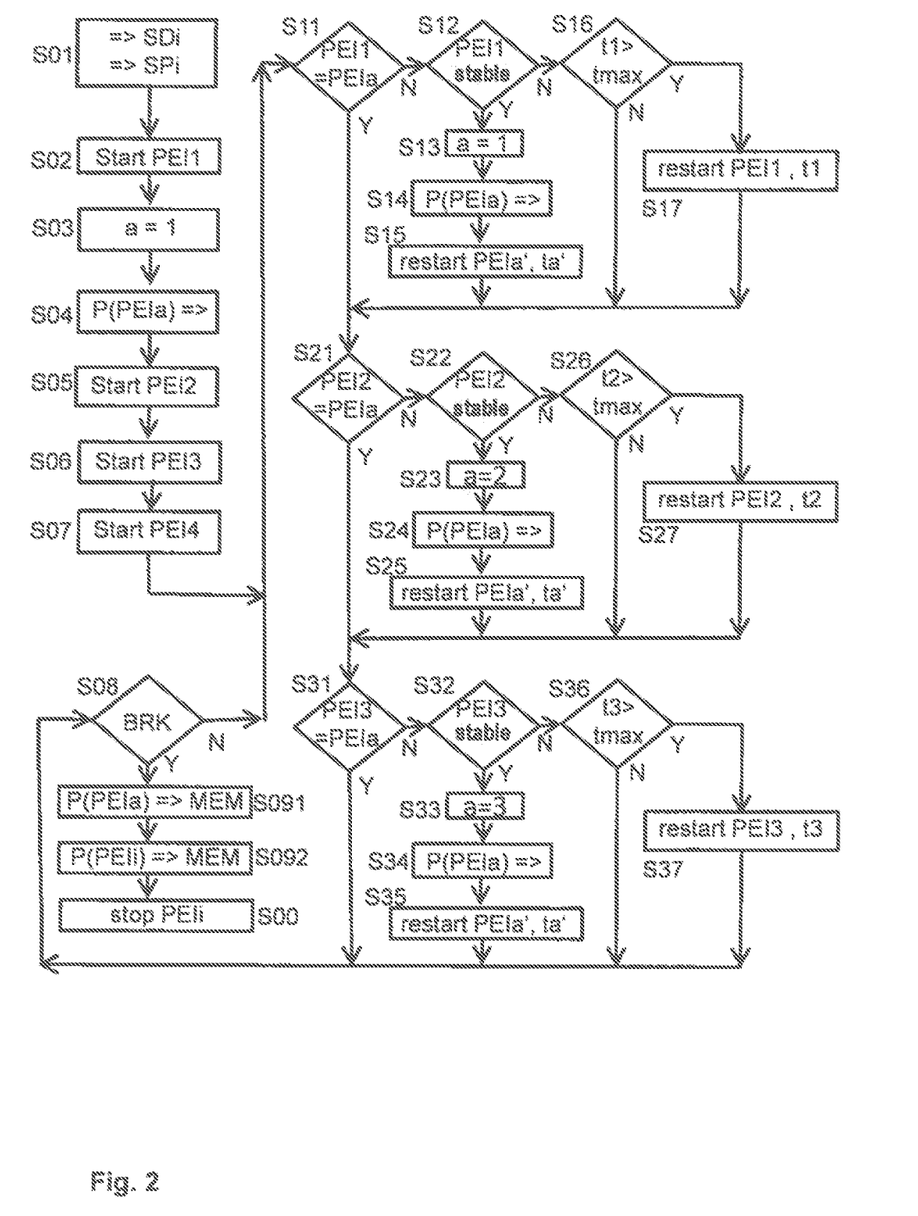
FIG. 2 shows a flowchart.

FIG. 2 shows a flowchart of a method according to the invention. In step S01, sensor data SDi and start points SPi are received. In step S02, the first position determination entity PEI1 is started. The position determination entity determines a position P(PEE1) from the sensor data SDi and a start position SP1. In step S03, the first position determination entity PEI1 is defined as the active position determination entity PEIa. The position P(PEIa), determined by the active position determination entity PEIa, is output as the currently determined position P in step S04. This is carried out continuously from this point on until a new active position determination entity PEIa is defined. In step S05, a further position determination entity PEI2 is started and determines a position P(PEI2) on the basis of the received sensor data SDi. Steps S06 and S07 relate to variants in which further position determination entities PEI3 and PEI4 are started.

Step S11 checks whether the first position determination entity PEI1 is the active position determination entity PEIa. If this is the case, the process branches to step S21 and otherwise to step S12. In the present case, that is to say directly after running through steps S01 to S07, the first position determination entity PEI1 is the active position determination entity PEIa, with the result that steps S12 to S17 are not run through in this case. They correspond to steps S22 to S27, which are described below.

Step S21 checks whether the further position determination entity, here the second position determination entity PEI2, is the active position determination entity PEIa. This is not the case in the present example, with the result that the process branches to step S22. Otherwise, the process branches to step S31. Step S22 checks whether the second position determination entity PEI2 is in a stable status. If this is the case, the process branches to step S23 and otherwise to step S26. In step S23, the second position determination entity PEI2 is defined as the active position determination entity PEIa. In step S24, the position P(PEIa) determined by the second position determination entity PEI2, which is now the active position determination entity PEIa, is output as the current position P. This is carried out continuously from the current time on until a further position determination entity PEIn is defined as the new active position determination entity PEIa. In step S25, the active position determination entity PEIa', the first position determination entity PEI1 in the present example, is restarted. At the same time, the time counter for the time ta' here t1, which belongs to the previous active position determination entity PEIa' is set to t1=0 and is restarted. The process then continues with step S31 at step S25. If the second position determination entity PEI2 has not yet reached a stable status, step S26 cheeks whether the time t2 which has elapsed since the restart of the second position determination entity PEI2 has exceeded a maximum value tmax. If this is not the case, the process continues with step S31. In contrast, if this is the case, the second position determination entity PEI2 is restarted and the time t2 is set to t2=0 and is likewise restarted. The process then continues with step S31.

Steps S31 to S37 occur only when a third position determination entity PEI3 is used according to one variant. The steps correspond to steps S21 to S27, which have already been described and are therefore not described again. Corresponding steps S41 to S47, which correspond to a variant of the exemplary embodiment in which a fourth position determination entity PEI4 is used, are not illustrated. After running through these steps, or after skipping them in the current exemplary embodiment, the process continues with step S08.

Step S08 checks whether the position determination is intended to be interrupted or terminated. If this is the ease, the process continues with step S091 and otherwise with step S11. In step S091, the position P(PEIa) currently determined by the active position determination entity PEIa is persistently stored. According to one variant of the invention, the currently determined position of the one or more further position determination entities PEIi is also persistently stored in step S092. Step S092 is skipped in the present example. In the subsequent step S00, all position determination entities PEIi are stopped.

According to one variant of the invention, a third position determination entity PEI3 and possibly further position determination entities PEIi are started with a time delay with respect to the second position determination entity PEI2. This is carried out either, as illustrated in FIG. 2, before first running through step S11 or only at a later time. For this purpose, a check is then carried out, for example, at step S16, if its result is negative, to determine whether the corresponding position determination entity PEIi has already been started. If this is not the case, the position determination entity is started. According to another variant, the further position determination entities PEIi are started or restarted after the expiry of a predefined time.

Figure 3:
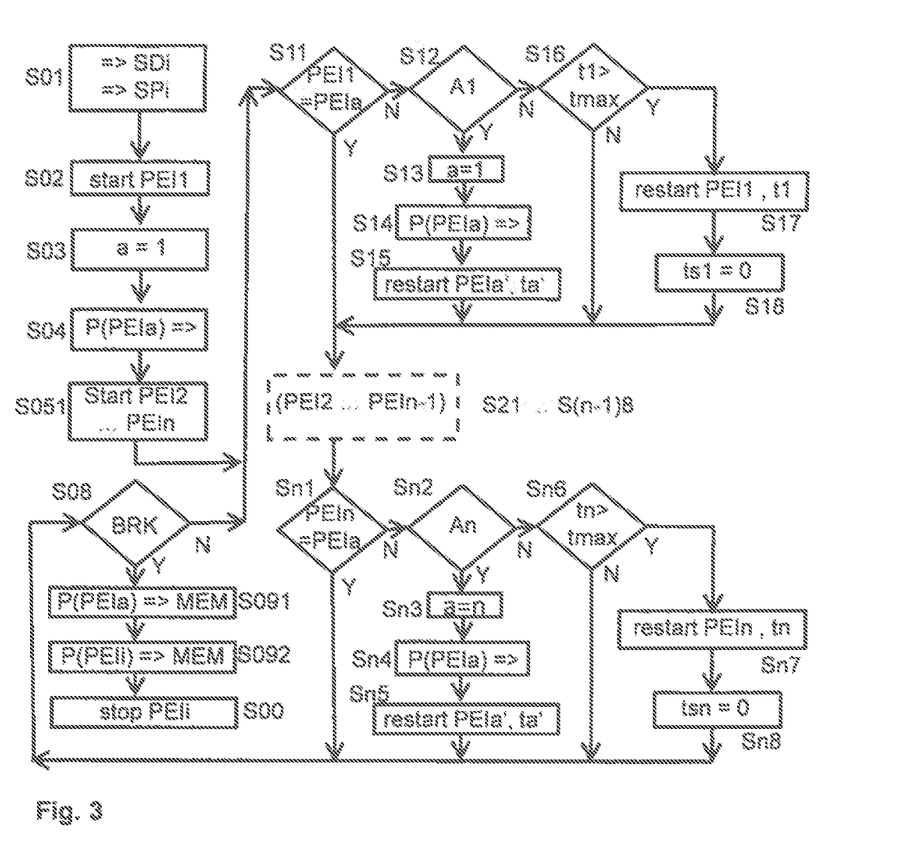
FIG. 3 shows a flowchart.

FIG. 3 shows a flowchart of a further method according to the invention. Steps which have already been described with respect to FIG. 2 are provided with the same reference symbols and are described again below only when this is necessary for understanding the exemplary embodiment; otherwise, they correspond to the previously described steps. Step S051 combines the start of the second position determination entity PEI2 and of each further position determination entity PEIi to the nth position determination entity PEIn. In step S18, a time ts1 is set to the value zero. The time ts1 begins to run when the first position determination entity PEI1 has reached the stable status. This and the manner in which the time ts1 and corresponding times tsi for the further position determination entities PEIi are used are described further below.

Steps S21 to S(n−1)8 for the second to (n−1)th position determination entity PEI2 to PEI(n−1), which correspond to steps S11 to S18, are combined in a dashed block. That for the nth position determination entity PEIn is illustrated. For steps S12 to Sn2, alternatives A1 to An are described with respect to the following figures.

Figure 4:
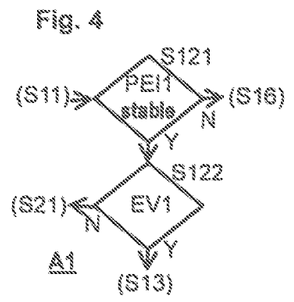
FIG. 4 shows a detail of one variant.

FIG. 4 describes a detail of one of these variants in a manner representative of the first position determination entity PEI1. A corresponding situation applies to the further position determination entities PEIi. The preceding and subsequent steps are placed between parentheses in the figure. Step S121 checks whether the position determination entity PEI1 has reached a stable status. If this is the case, step S122 cheeks whether a predefined event EV1 has occurred. If this is the case, the process branches to step S13 and otherwise continues with step S21.

Figure 5:
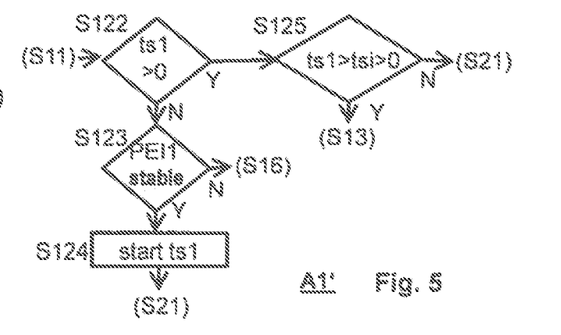
FIG. 5 shows a detail of a further variant.

FIG. 5 describes a detail of a further variant. In this respect, step S122 checks whether foe time ts1 that has elapsed since the starting or restarting of the first position determination entity PEI1 is greater than zero. If this is the case, step S125 checks whether there is a further time tsi for a further position determination entity PEIi that is greater than zero but less than ts1. If this is the case, this is considered to be an event, on account of which the first position determination entity PEIi is defined as the new active position determination entity PEIa, which is carried out in step SB and the subsequent steps. If there is no further position determination entity PEIi that has already reached a stable state or if there is a position determination entity PEIi that has already reached the stable status for longer than the first position determination entity PEI1, the process continues with step S21. If the time ts1 that has elapsed since the starting or restarting of the first position determination entity PEI1 has the value zero, step S123 checks whether the first position determination entity PEI1 has reached a stable status. If this is not the case, the process branches to step S16. Otherwise, this means that the first position determination entity PEI1 has just reached the stable status. Therefore, the counter for the time ts1 is started in step S124. The process then continues with step S21.

Figure 6:
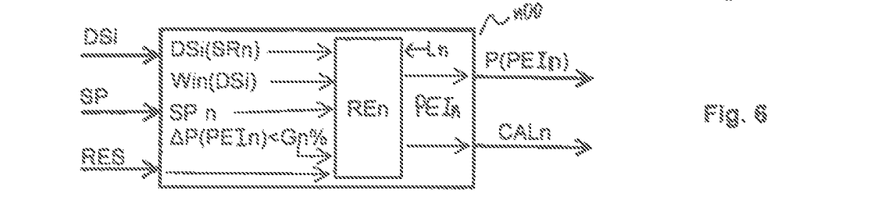
FIG. 6 shows a position determination unit.

FIG. 6 shows a position determination unit n00 according to the invention which may alternatively also be implemented as a position determination entity PEIn in software. The sensor data DSi are sampled at a sampling rate SRn that can be set as a parameter of the position determination entity PEIn. This parameter is set in such a manner that the sampling rate SRn is high when the position determination entity PEIn is defined as the active position determination entity PEIa, whereas it is previously low. In the latter case, only a fraction of the received sensor data DSi is used to determine the position by the position determination entity PEIn. This is useful, in particular, when the position determination entity PEIn is implemented in software and, on account of the low sampling rate, uses only little computing capacity of the computer REn. The progress of other processes running in parallel is therefore not impaired or is at least only slightly impaired by the position determination entity PEIn.

The position determination entity PEIn also has a weighting factor Win for each of the sensor signals DSi. The data from particular sensors are given a higher weighting by the weighting factor Win, with the result that, despite identical method steps, the position determination by the position determination entity PEIn differs from the other further position determination entities PEIi. This has the advantage that an incorrect sensor signal, the weighting factor Win of which is low, does not have any influence or has only a slightly negative influence on the corresponding position determination entity PEIn. The probability of determining a correct position P is therefore increased.

The start point SPn is loaded from the persistent memory 400 as a parameter during the restart for the position determination entity PEIn in order to have an improved start point as the starting point. Alternatively, a previously stored start point SPn is not used. The time until the stable status is reached is therefore increased, which is less important in the case of a relatively large number of further position determination entities PEIi running in a parallel manner. In this case, it is advantageous that a possibly incorrect stored start point SPn is then not important.

If, according to one embodiment variant, the difference ΔP(PEIn) between the temporally successive positions P(PEIn) determined by the position determination entity PEIn is below an accuracy Gn, the status of the position determination entity PEIn is classified as stable. Gn is also a parameter which is selected differently for different position determination entitles PEIi according to one variant in order to change some of the entities to the stable status, but to change others with greater reliability. The undershooting of the value Gn can also be considered to be an event EV(Gn) which defines the stable status.

The latency Ln is also a parameter that is selected differently according to one variant. The latency Ln is a period in which the sensor data DSi to be evaluated must lie in order to be taken into account by the position determination entity PEIn. All sensor data DSi are provided with a time stamp that indicates the time at which the sensor measured the corresponding value. On account of propagation time differences and possibly different propagation paths, the data DSi from the different sensors Si do not necessarily arrive at the position determination entity PEIn in the correct temporal sequence. A time window, the latency Ln, of 100 ms for example is therefore provided, within which the time stamp must lie so that a sensor data item DSi is taken into account. If its time stamp is before the current time by more than the latency Ln, it is ignored as being out of date. Under certain circumstances, this may result in data DSx from a particular sensor Sx not being evaluated at all if they arrive at the position determination entity PEIn with an overall excessive delay. It is likewise possible for only some of the data DSx from a sensor Sx to arrive at the position determination entity PEIn and for incorrect position determination to be carried out on account of the incompleteness of the data. In these and similar cases, it is appropriate to increase the latency Ln in order to exclude this error source. One variant of the invention provides for the latency Li of all or a large part of the further position determination entitles PEIi that are not the active position determination entity PEIa to be allowed to be twice, three times, ten times or one hundred times the latency in comparison with the latency of the active position determination entity PEIa.

Figure 7:
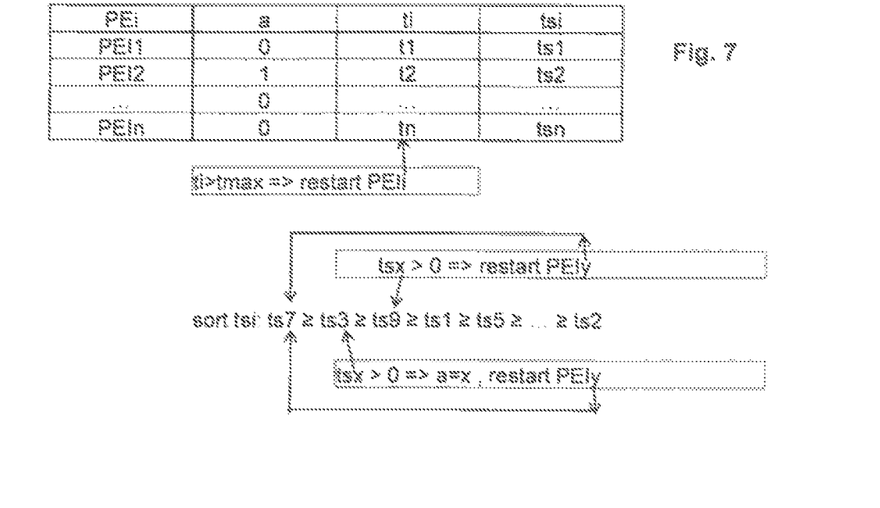
FIG. 7 shows a variant of a method according to the invention.

FIG. 7 shows a further variant of a method according to an aspect of the invention. The upper part indicates a table in which it is stated, for each position determination entity PEI1 to PEIn, whether it is the active position determination entity PEIa, what time ti has elapsed since it was started or restarted and what time tsi has elapsed since the corresponding position determination entity PEIi reached a stable status. According to one variant, a check is carried out in order to determine whether the time ti which has elapsed since the restarting of the corresponding position determination entity PEIi exceeds a maximum value tmax without the position determination entity PEIi having reached a stable status. If this is the case, this position determination entity PEIi is restarted.

According to another variant of the invention, the times tsi that have elapsed since the corresponding position determination entity PEIi reached a stable status are sorted according to the magnitude. In one example, the third position in this sorting is checked in order to determine whether the corresponding time is tsx>0. If this is the case, at least three of the further position determination entitles PEIn are in a stable status. In this case, that position determination entity PEIy that has already reached the stable status for the longest time is restarted. In the example depicted, the seventh position determination entity PEI7 is restarted if the position determination entity PEI9, which is at the third position in the sorting, has already reached the stable status.

According to one variant, a check is carried out in order to determine whether the time at the second position in the sorting is tsx>0. If this is the case, the associated position determination entity PEIx is defined as the active position determination entity PEIa and the position determination entity PEIy already in the stable status for the longest time is restarted. In the example illustrated, the third position determination entity PEI3 becomes the active position determination entity PEIa and the seventh position determination entity PEI7 is restarted. The previous active position determination entity is likewise restarted.

In summary, the present invention relates to a method for determining a position, in particular of a vehicle, a computer program and a computer program product which are used to carry out the method, a storage medium on which a corresponding computer program product is stored, a corresponding apparatus and a navigation device. According to the invention, a first position determination entity (PEI1) is defined (S03) as the active position determination entity (PEIa). The position (P(PEIa)) determined by the active position determination entity (PEIa) is output (S04) as the currently determined position (P). A further position determination entity (PEI2, PEIi) is started (S05) and determines a position (P(PEI2)) on the basis of the received sensor data (DSi). If the further position determination entity (PEI2) has reached a stable status, it is defined (S24) as the active position determination entity (PEIa).

The correct function of combining the data from different sensors 21, 22, 23, which is also referred to as sensor data merging, is tied to the compliance with certain input prerequisites for the incoming sensor data DSi and the movement scenarios of the unit whose position is intended to be determined. If these prerequisites are violated, the combining of the sensor data DSi may be permanently changed to a non-operating state that also persists when the prerequisites are complied with again. The present invention prevents this state in which the sensor data merging does not permanently operate even though the prerequisites are complied with again in the meantime. For this purpose, new position determination entitles PEIi which carry out sensor data merging are regularly started. They learn their calibration without resorting to the state of entitles PEIi which have already been running for a relatively long time. The position output P(PEIa) of only one position determination entity, the position determination entity PEIa defined as active, is forwarded to the outside.

According to one embodiment, a controller 500 monitors two or more entities PEIi. These are Kalman filters, for example. A plurality of entities PEIi are always supplied with the available sensor data DSi, but only one entity, the active entity PEIa, forwards the positioning results P(PEIa) to the outside. The controller 500 monitors whether the remaining entitles PEIi reach a calibrated, that is to say stable, state in an appropriate time, for example determined by a clock or by a certain number of odometer pulses or a certain number of starting operations or the like. If an entity PEIi does not reach a calibrated state in a predefined time, it is reset by a reset signal RESi from the controller 500. The selection, that is to say the positioning result P to which position determination entity PEIi is forwarded to the outside, is changed, for example, during storage in the persistent memory 400 or during loading from the latter. This is used to avoid jumps in the output. According to one exemplary embodiment such a change is carried out when a position determination entity PEIi has reached a calibrated state. This position determination entity then becomes the new active position determination entity PEIa. The previous active position determination entity is reset and is now used as a further position determination entity PEIi. The invention does not refer to the manner in which the input conditions are violated. It can therefore be readily applied as a second fall-back level behind specific solutions. Specific solutions deal with a special error cause which must, however, be known for this purpose. Unknown error causes or those for which there is not yet a specific solution are covered by the solution according to the invention.

One advantageous development involves always selecting the active position determination entity PEIa directly before storage in the persistent memory 400 and storing only values of the active position determination entity PEIa. Only the values of the start point of the active position determination entity PEIa then persist, but not those of the other position determination entities PEIi. These position determination entities are restarted when the position determination is next started without having a predefined start point SPi. The calibration must then be carried out before the position determination is interrupted again. In this case, it may therefore take somewhat longer to reach a stable state.

In the case of a considerable increase in the latency Ln in the sorting queues of the entities PEIi, sensor data DSi that arrive late are also concomitantly used. Therefore, no measurements need to be rejected. In the ease of downsampling at the sensor data input 101, 201, that is to say if a lower sampling rate Sri is used, this reduces the CPU load, that is to say the load on the computer REi, by the respective position determination entity PEIi. For example, in the ease of sensor data DS22 from a sensor 22 of an odometer, the odometer message must be added in this case over a corresponding time, for example 250 ms, before it is supplied to the entities PEIi.

If the current positions SPi of all position determination entities PEIi are stored in the persistent memory 400, this means increased use of CPU and RAM. Depending on the embodiment, repeated demand for persistent memory 400 also occurs. However, one advantage is that long-term recovery after, without exception, every violation of the input condition is enabled.

According to one variant of the invention, operating states of two or more position determination entities PEIi are stored in the persistent memory 400 even though a single stored operating state, here usually referred to as the start point SPi in a simplified manner, would suffice for all operating states during normal operation.

An exemplary application for combining the data DSi from a plurality of sensors 21, 22, 23 and the input prerequisites to be complied with in this case for the sensor data DSi are as follows: The time stamps of the input data must be monotonously increasing. A measured GPS position must not deviate from the correct location by more than 600 m. The direction of travel determined by the sensor input must be correct. If, for example, the direction of travel sensor input is generated from the control of the reversing light, the prerequisites are violated as soon as the vehicle rolls backward, for instance on a slope, while no reverse gear is engaged. The rear axle is assumed to be unsteered, but in reality has at least slight concomitant steering.

A highlight of the invention is that there is no component that needs to detect the non-operating state. The invention is aimed precisely at being freed from such states that are not known and for which there is therefore no explicit detection. For known types of errors, there are specific solutions that take effect more quickly than the solution proposed according to the invention. The invention advantageously describes a second fall-back level that is slower but is non-specific with respect to the type of error. The controller 500 does not change over from the active position determination entity PEIa to one of the further position determination entities PEIi when it is necessary, but rather whenever it is possible. This is triggered here by one of the further position determination entities PEIi having gained sufficient trust in its own state for assuming responsibility for active operation.

In the times in which the system is not running, the state of the position determination entities PEIi is stored. The storage space for this is often very expensive or restricted. The calibration comprises a multiplicity of parameters, such as sensor offsets, sensor scaling errors, the current wheel circumference four times, the track width, etc., which are initially unknown. These parameters are gradually determined by observing the journey using a plurality of sensors 21, 22, 23 in overdetermined situations. The calibration indicator signal CALi finally indicates that the remaining uncertainties are small enough to start active operation. The sorting input data buffer is a component used to ensure the monotonous development of the sensor time stamps. This is carried out, on the one hand, by a limited backlog and, on the other hand, by rejecting sensor data DSi. The backlog has the disadvantage that the position determination entitles PEIi "live in the past". For the position determination entities PEIi that have not been connected to the output, it is not a disadvantage, however, and the backlog latency Ln can therefore be increased in favor of fewer rejected data items without this having a negative effect.

It is left to the discretion of a person skilled in the art to modify one or more of the measures mentioned or to use them in another combination without going beyond the concept of the invention even if these are not explicitly described here Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method in a navigation device having a first position determination entity (PEI1), a further position determination entity (PEI2, PEIi), a controller (500, SE) and a plurality of sensors (21, 22, 23), the method for determining a position and comprising receiving (S01), by the navigation device, sensor data (DSi) from the sensors;

starting (S02) the first position determination entity (PEI1) of the navigation device based on a start position (SP1) and the received sensor data (DSi);

defining (S03) the first position determination entity (PEI1) as the active position determination entity (PEIa);

outputting (S04), by the navigation device, the position (P(PEIa)) determined by the active position determination entity (PEIa) of the navigation device as the currently determined position (P);

starting (S05) the further position determination entity (PEI2, PEIi) of the navigation device based on the received sensor data (DSi);

checking (S21, Si1) whether the further position determination entity (PEI2, PEIi) of the navigation device has reached a stable status;

in a case in which the further position determination entity (PEI2, PEIi) of the navigation device has reached a stable status:

defining (S23, Si3) the further position determination entity (PEI2, PEIi) of the navigation device as the active position determination entity (PEIa) of the navigation device, restarting (S25, Si5) the previous active position determination entity (PEIa') of the navigation device, and outputting (S24, Si4), by the navigation device, the position (P(PEIa)) determined by the new active position determination entity (PEIa) as the current determined position (P);

in a case in which the further position determination entity (PEI2, PEIi) of the navigation device has not reached a stable status after a predefined event (S16) has occurred:

restarting (S27, Si7) the further position determination entity (PEI2, PEIi) of the navigation device;

in a case in which the determination of the position (P) is intended to be interrupted or terminated:

persistently storing (S091) the currently determined position (P) and stopping (S00) the active position determination entity (PEIa) of the navigation device and the further position determination entity (PEI2, PEIi) of the navigation device, otherwise:

repeating the previous steps after the checking step (S11).

2. The method according to claim 1, further comprising: starting (S06, S07, S051) a plurality of further position determination entities (PEIi) of the navigation device with a delay;

defining (Si3) the respectively next further position determination entity (PEIi) of the navigation device that reaches a stable status as the active position determination entity (PEIa) of the navigation device.

3. The method according to claim 2, wherein a further position determination entity (PEI2, PEIi) of the navigation device is defined (S23, Si3) as the active position determination entity (PEIa) of the navigation device and the previous active position determination entity (PEIa') of the navigation device is restarted (S15, Si5) upon the occurrence (S122, Si22) of a predefined event (EV1, EVi) instead of upon the reaching (S12, Si2) of a stable status of the further position determination entity (PEIi).

4. The method according to claim 3, further comprising: restarting (Sy7) a further position determination entity (PEIy) of the navigation device that is already in a stable status in a case in which a predefined number of further position determination entities (PEIi) of the navigation device have reached a stable status after it.

5. The method according to claim 4, wherein, when defining (Sx4) a further position determination entity (PEIx) of the navigation device as the active position determination entity (PEIa), selecting that further position determination entity (PEIx) of the navigation device that has reached a stable status as the n-last entity.

6. The method according to claim 5, wherein the active position determination entity (PEIa) of the navigation device and the at least one further position determination entity (PEIi) of the navigation device correspond to identical method steps.

7. The method according to claim 6, wherein the active position determination entity (PEIa) of the navigation device and the at least one further position determination entity (PEIi) of the navigation device differ in the value of at least one parameter (SRi, Wii, Gi).

8. The method according to claim 7, wherein the parameter that has different values in the active position determination entity (PEIa) of the navigation device and in the further position determination entity (PEIi) of the navigation device is at least one of the following parameters:

latency (Li), sampling rate (SRi), and an event (EV(Gi)) defining the stable status.

9. A non-transitory computer-readable medium storing a computer program product directly loadable into the internal memory of a digital computer, the computer program product comprising software code sections that carry out the steps according to claim 1 when the computer program product runs on a computer.

10. An apparatus configured to carry out the method steps of claim 1.

11. A navigation device comprising:

at least two sensors (21, 22, 23), configured to receive sensor data (DSi), the sensor data (DSi) being suitable, alone or in combination with other data, for determining a position;

a first position determination unit (100, PEE1) having a sensor input (101) configured to input sensor data (DSi) from the sensors (21, 22, 23), a position output (111, 211) configured to output a determined position (P(PEE1), P(PEEE2)), a status output (102) and a computer (RE1, RE2) configured to determine the position (P(PEE1), P(PEE2)) from the sensor data (DSi);

at least one further position determination unit (200, PEE2) having a sensor input (102) connected to the sensors (21, 22, 23), a position output (211) and a status output (202), wherein the at least one further position determination unit (200, PEE2) is arranged parallel to the first position determination unit (100, PEE1);

a controller (500, SE) having status inputs (501, 502) connected to the status outputs (102, 202) of the position determination units (100, 200), control outputs (511, 512) connected to reset inputs (103, 203) of the position determination units (100, 200), and a logic (510, LE) configured to select a position determination unit (100, 200) whose determined position (P(PEEi)) is output as the currently determined position (P), and a selection output (503), a changeover switch (300) configured to have position inputs (301, 302) which are connected to the position outputs (111, 211) of the position determination units (100, 200), and a position output (303) at which the selected position (P) can be tapped off.

12. A vehicle having a navigation device according to claim 11.

* * * * *